United States Patent [19]

Rieck et al.

[11] Patent Number: 4,631,158

[45] Date of Patent: Dec. 23, 1986

[54] SHAPED ARTICLES OF SILICATE MATERIAL, A PROCESS FOR THEIR PRODUCTION AND THEIR USE

[75] Inventors: Hans-Peter Rieck, Hofheim am Taunus; Martin Schott, Steinbach; Jürgen Russow, Kelkheim, all of Fed. Rep. of Germany

[73] Assignee: Hoechst Aktiengesellschaft, Fed. Rep. of Germany

[21] Appl. No.: 793,562

[22] Filed: Oct. 31, 1985

[30] Foreign Application Priority Data

Nov. 3, 1984 [DE] Fed. Rep. of Germany ....... 3440252

[51] Int. Cl.$^4$ .............................................. B29C 27/60
[52] U.S. Cl. ........................................ 264/43; 264/44; 264/56; 264/113; 264/235; 264/346; 501/80; 501/123; 501/133; 501/154
[58] Field of Search ...................... 264/43, 44, 56, 113, 264/235, 346; 501/80, 123, 133, 154; 502/243, 244, 250, 251, 259, 260; 428/351

[56] References Cited

U.S. PATENT DOCUMENTS

| | | | |
|---|---|---|---|
| 3,620,783 | 11/1971 | Mahler et al. | 106/69 |
| 3,788,866 | 1/1974 | Flood et al. | 106/69 |
| 3,927,697 | 12/1975 | Baumler et al. | 138/145 |
| 3,940,255 | 2/1976 | Harrington et al. | 65/33 |
| 4,039,339 | 8/1977 | Elmer et al. | 106/54 |
| 4,049,464 | 9/1977 | Tutsek et al. | 106/288 B |
| 4,180,409 | 12/1979 | Manimann | 106/39.6 |
| 4,346,177 | 8/1982 | Cochet et al. | 501/123 |
| 4,384,046 | 5/1983 | Nakagami | 501/95 |
| 4,410,502 | 10/1983 | Yamaguchi et al. | 423/345 |

Primary Examiner—Roland E. Martin
Assistant Examiner—Patrick J. Ryan
Attorney, Agent, or Firm—Connolly and Hutz

[57] ABSTRACT

A process for the production of shaped articles from silicate material by extrusion and/or pelleting and subsequent annealing is described. In this process, pulverulent layered silicic acids of the general formula $H_2Si_yO_{2y+1}$, in which y is a number from 1.7 to 24, or salts thereof, in which all or some of the H is replaced by at least one cation from the group comprising $Li^+$, $Na^+$, $K^+$, $NH_4^+$, $Ca^{2+}$, $Cu^{2+}$, $Co^{2+}$, $Ni^{2+}$ and $Mg^{2+}$, are mixed with water or an organic solvent, the mixture is extruded and/or pelleted to give roll-shaped or tube-shaped pieces and these are then dried and annealed under conditions such that the starting material is chiefly converted into cristobalite and/or tridymite. The same material can also be pressed in a molding tool under pressure. Under these conditions, shaped articles which predominantly consist of cristobalite or tridymite and have a Shore hardness of at least 70 can be obtained.

21 Claims, No Drawings

SHAPED ARTICLES OF SILICATE MATERIAL, A PROCESS FOR THEIR PRODUCTION AND THEIR USE

The present invention relates to shaped articles consisting chiefly of cristobalite and/or tridymite, their use and a process for their production starting from silicic acids with a layered structure.

The silicic acids, or their salts, used as the starting substance differ in structure from amorphous silicic acids or silicic acids with a skeleton structure, or salts thereof, such as, for example, silicalite (U.S. Pat. No. 4,061,724).

Shaped articles of cristobalite and/or trydymite are produced industrially from quartz. Thus, quartz fluor can be pressed with 2 to 3% of calcium hydroxide (as a binder) and a little sulfite waste liquor (to improve the workability of the compositions), and the shaped pieces can then be annealed. Products with a high cristobalite content (silica bricks) are finally formed at 1,470°. The remainder consists of tridymite, $SiO_2$ which is amorphous under X-ray, a little quartz and a little wollastonite. In contrast, if the compositions are burned below 1,470° for a prolonged period, contents of up to 30% of tridymite can be achieved. Although the silica bricks are highly stable to heat, their stability to changes in temperature up to 700° C. is poor. A disadvantage of this process is the need to add cementing products, which means that, in addition to cristobalite and, where appropriate, tridymite, the finished shaped article also contains other constituents. However, pulverulent quartz, cristobalite or tridymite cannot be pressed by themselves to give shaped pieces which have a sufficient mechanical stability. Vitreous fused quartz bricks which have been prepared by fusing pure quartz sand can furthermore be annealed at 1,400° and compact cristobalite bricks can thus be obtained. A disadvantage here is the high consumption of energy for fusing the quartz sand and annealing the cooled vitreous fused quartz. A particular disadvantage is that the conversion of quartz into cristobalite requires very high temperatures.

Shaped articles which have the maximum possible chemical uniformity are required for some purposes, for example for catalyst supports. However, it may also be important for bricks, pipes or vessels which are resistant to high temperatures that they consist virtually of only one component, since this guarantees that the properties are not modified on prolonged exposure to heat. In contrast, a chemical reaction may occur in a multi-component system.

There was therefore the object of preparing a silicate material which is stable at high temperatures from a chemically uniform starting material, conversion into the end product proceeding easily.

It has now been found that stable shaped pieces which are converted into cristobalite and/or tridymite on annealing can be produced from silicic acids with a layered structure and some of their monovalent and divalent salts. Several possibilities are available for the production of shaped pieces, for example extruding of elongated shaped pieces on an extruder ("dynamic pressing"), pelleting of pulverulent starting material, with the addition of a liquid which is later evaporated off, on a pelleting dish, the use of a molding tool, for example a plunger press ("static pressing") or a roll press for producing briquettes, or rolling out.

The present invention relates to a process for the production of shaped articles from silicate material, by extruding and/or pelleting and subsequent annealing, which comprises mixing pulverulent layered silicic acids of the general formula $H_2Si_yO_{2y+1}$, in which y is a number from 1.7 to 24, or salts thereof, in which all or some of H is replaced by at least one cation from the group comprising $Li^+$, $Na^+$, $K^+$, $NH_4^+$, $Ca^{2+}$, $Cu^{2+}$, $Co^{2+}$, $Ni^{2+}$ and $Mg^{2+}$, with water or an organic solvent, extruding and/or pelleting this mixture and then drying it and annealing it under conditions such that the steering material is chiefly converted into cristobalite and/or tridymite.

During extrusion, a continuous strand of a paste of the silicate material is ejected through a molding tool which is not closed on all sides and the strand is cut into individual pieces by mechanically operating dividers. Extruders and plunger presses with an open mold, such as extruder presses, for example, are employed for this purpose (c.f. Ullmanns Encyklopädie der technischen Chemie (Ullmann's Encyclopedia of Industrial Chemistry), 3rd edition 1, page 734). The roll-shaped or tube-shaped pieces are then dried. The roll-shaped pieces can also be rounded off on a pelleting dish and then give, after drying (usually at about 120° C.), dimensionally stable, somewhat spherical-shaped granules of considerable hardness.

Annealing is in general carried out at 500°–1,700° C.

The longer the mold through which the paste is to be pressed, the greater the friction and the pressure to be applied. If elongated molds are used, in particular those which lead to thin shaped articles, plastic flowability of the silicate composition is desirable. This is promoted by adding plasticizers and extrusion auxiliaries, such as methylcellulose and diglycol stearate, and is of importance for the production of honeycombed articles.

During pelleting, liquid is sprayed onto a dry powder, with a simultaneous rolling movement. The raw material is thereby built up to pellets (c.f. Ullmanns Encyklopädie (Ullmann's Encyclopedia), 4th edition 2, page 323). Pelleting dishes and pelleting drums, for example, are used for this purpose. Hollow spheres can be produced by pelleting in accordance with the method of German Offenlegungsschrift No. 2,353,631.

The starting substances for the process according to the invention are known or can easily be prepared from known products.

Layered silicic acids and alkali metal salts thereof have been found in natural deposits (H. P. Eugster, Science 157, 1177–1180; T. P. Rooney et al., Amer. Mineral., 54, 1034–1043 (1969); G. Maglione and M. Servant, C. R. Acad. Sci., Ser. D., 277, 1721–1724 (1973); J. L. McAtee, Jr. et al., Amer. Mineral., 53, (1968), 2061–2069).

Eugster, inter alia, has given the formulae $NaSi_{11}O_{20}.5(OH)_4.3H_2O$ and $NaSi_7O_{13}(OH)_3.3H_2O$ for the mineral kenyaite and magadiite described there. A differentiation is made here between chemically bonded water (OH groups) and water of crystallization. However, this differentiation cannot be applied with certainty. The same substances can also be formulated as $Na_2Si_{22}O_{45}.10H_2O$ and $Na_2Si_{14}O_{29}.9H_2O$.

A number of alkali metal salts and silicic acids with a layered structure have also already been obtained synthetically. The free silicic acids can be isolated from these alkali metal silicates by acid ion exchange. The layered structure of the compounds is thereby retained.

U.S. patent application Ser. No. 688,184 relates to a process, which is also industrially practicable, for the preparation of crystalline layered alkali metal silicates with molar ratios of $Na_2O/SiO_2$ of 1:14 to 1:22. According to this process, an acid compound is addded to an alkali metal silicate dissolved in water or an amorphous alkali metal silicate with a molar ratio of $M_2O/SiO_2$, in which M represents an alkali metal, of 0.24 to 2.0 in an amount such that a molar ratio of $M_2O$ (not neutralized/$SiO_2$ of 0.05 to 0.239 is achieved, a molar ratio of $SiO_2/H_2O$ of 1:5 to 1:100 is established, if appropriate, by dilution and the reaction mixture is kept at a reaction temperature of 70° to 250° C. until the layered alkali metal silicate has crystallized out. A layered alkali metal silicate with a molar ratio of $Na_2O/SiO_2$ of about 1:21 and with a kenyaite structure, for example, can be obtained in this manner. The corresponding free acid can be prepared therefrom by acid ion exchange. The compounds thus obtained are designated Na-SKS-1 and H-SKS-1 below.

A layered sodium silicate with a molar ratio of $Na_2O/SiO_2$ of about 1:14 and with the magadiite structure can also be prepared by this process in the presence of seed crystals with the magadiite structure. The corresponding free silicic acid is obtained therefrom by acid ion exchange. These compounds are designated Na-SKS-2 and H-SKS-2 below.

Several layered silicates with the approximate composition $Na_2Si_2O_5$ are known. These include the following products designated Na-SKS-5, Na-SKS-6, Na-SKS-7 and Na-SKS-11.

Na-SKS-5 can be prepared in accordance with Glastechnischen Ber. 37, 194-200 (1964). In the X-ray diffraction diagram, the product resembles $\alpha$-$Na_2Si_2O_5$. The X-ray spectrum has the number 22-1397 according to the list in Powder Diffraction File, Inorganic Phases, (Int. Centre f. Diffraction Data) Swarthmore 1983. The free acid H-SKS-5 is obtained from Na-SKS-5 by acid ion exchange. This product resembles the silicic acid $H_2Si_2O_5$-I in the X-ray diffraction diagram (F. Liebau, Z. Kristallgr. 120 (1964), 427).

Na-SKS-6 can be prepared in accordance with Zeitschrift für Kristallogr. 129, 396-404 (1969). It resembles $\delta$-$Na_2Si_2O_5$. H-SKS-6 is obtained from Na-SKS-6 by acid ion exchange.

Several layered silicates with the approximate composition $Na_2Si_2O_5$ are known. These include the following products designated Na-SKS-5, Na-SKS-6, Na-SKS-7 and Na-SKS-11.

Na-SKS-5 can be prepared in accordance with Glastechnischen Ber. 37, 194-200 (1964). In the X-ray diffraction diagram, the product resembles $\alpha$-$Na_2Si_2O_5$. The X-ray spectrum has the number 22-1397 according to the list in Powder Diffraction File, Inorganic Phases, (Int. Centre f. Diffraction Data) Swarthmore 1983. The free acid H-SKS-5 is obtained from Na-SKS-5 by acid ion exchange. This product resembles the silicic acid $H_2Si_2O_5$-I in the X-ray diffraction diagram (F. Liebau, Z. Kristallgr. 120 (1964), 427).

Na-SKS-6 can be prepared in accordance with Zeitschrift für Kristallogr. 129, 396-404 (1969). It resembles $\delta$-$Na_2Si_2O_5$. H-SKS-6 is obtained from Na-SKS-6 by acid ion exchange.

In the X-ray diffraction diagram, the product resembles a silicic acid which has the number 27-606 in the list of the Joint Committee on Powder Diffraction Standards.

Na-SKS-7 can be prepared in accordance with Glastech. Ber. 37, 194-200 (1964). It resembles $\delta$-$Na_2Si_2O_5$.

Na-SKS-11 can be prepared in accordance with Glastechn. Ber. 37, 194-200 (1964), and in accordance with Zeitschrift für Kristallogr. 129, 396-404 (1969). It resembles $\gamma$-$Na_2Si_2O_5$.

An industrially practicable route for the preparation of Na-SKS-5, Na-SKS-6 and Na-SKS-11 is described in U.S. patent application Ser. No. 732,418. Na-SKS-9, Na-SKS-10 and Na-SKS-13 are layered silicates with a different composition.

Na-SKS-9 can be prepared in accordance with Bull. Soc. franc. Min. Crist., 95, 371-382 (1972). It has the approximate composition $NaHSi_2O_5.H_2O$. The X-ray spectrum has the number 27-709.

We prefer as starting materials those substances with magadiite structure (H-SKS-2) or kenyaite structure (H-SKS-1), because they are easy to prepare. The corresponding salts have the further advantage that the $SiO_2$ content, which can later be converted into tridymite and/or cristobalite, is particularly high.

When the layered silicic acid sodium salts mentioned are treated with aqueous acid, all or some of the sodium ions can be replaced by $H^+$ ions and the free silicic acids with a layered structure can thus be prepared. These can be converted, for example with solutions of LiOH, $NH_4OH$ or $Ca(OH)_2$, into the corresponding salts. Since the alkali metal salts of the layered silicic acid behave as ion exchangers, they can also easily be converted, by treatment with salt solutions (monovalent or divalent metals), into layered silicates in which all or some of the $H^+$ (of the free layered silicic acid) is replaced by the cations to be introduced.

Some of the cations in salts containing divalent cations can likewise be replaced by protons by treatment with dilute acids. All or some of the protons can then be replaced by $NH_4^+$ by reaction with metered amounts of $NH_4OH$.

The anhydrous layered silicic acids and layered silicates can be employed for the process according to the invention, just as the hydrates of these compounds can. In some cases, only the hydrates are anyway known.

During extrusion, the amount of water or organic solvent added should be such that a paste and not a liquid is formed from the pulverulent layered silicate. The nature of the organic solvent employed, if appropriate, is not critical. However, it should not decompose under heat to deposit carbon instead of evaporating. Solvents with a boiling point of 50° to 150° C. are preferred, especially polar, water-soluble compounds, such as monovalent or polyvalent aliphatic alcohols, for example methanol or ethylene glycol.

Another process for the production of shaped articles from silicate material by pressing and annealing comprises pressing pulverulent layered silicic acids of the general formula $H_2Si_yO_{2y+1}$, in which y is a number from 1.7 to 24, or salts thereof, in which all or some of the $H^+$ is replaced by at least one cation from the group comprising $Li^+$, $Na^+$, $K^+$, $NH_4^+$, $Ca^{2+}$, $Mg^{2+}$, $Cu^{2+}$, $Co^{2+}$, $Ni^{2+}$ and $Mg^{2+}$, in a molding tool under pressure to give shaped pieces and annealing the shaped pieces during or after pressing under conditions such that the starting material is chiefly converted into cristobalite and/or tridymite. If moistened powder is used, the shaped pieces must also be dried before annealing.

In this process, in contrast to extrusion, molding tools which are closed on all sides are employed. The silicate particles move only small distances, and friction does not play a great part.

The production of shaped pieces in a molding tool under pressure is known to the expert, for example from the production of shaped articles from hardenable organic molding compositions. In this process, although it is possible to use water or an organic solvent, it is not necessary. The pressure to be applied is in general higher than in the case of extrusion and is usually more than 10 bar. It must in any case be sufficiently high that the shaped piece does not disintegrate after removal of from the molding tool. Moreover, a higher operating pressure leads to a higher density and less porosity. The upper limit of the pressure applied is determined only by the construction of the molding tool. Pressures of more than 5,000 bar are possible. Preferred pressures are not more than 2,000 bar and pressures above 100 bar, in particular above 200 bar and preferably 400 to 600 bar. The shaped pieces thus produced are harder than the abovementioned granules. A dry powder of layered silicic acids can thus be pressed in a tube by a plunger under a pressure of 500 bar to give cylindrical articles, which—even without annealing—may have Shore hardnesses of more than 40. This facilitates handling and transportation into the annealing furnace.

The conditions under which the starting material is converted into cristobalite and/or tridymite also depend somewhat on the starting substance itself. The annealing temperatures are between 500° to about 1,700° C., the conversion proceeding more rapidly at high temperatures. The nature of the layered silicate employed also has a substantial influence on whether cristobalite, tridymite or a mixture of the two $SiO_2$ modifications is produced.

Cristobalite is formed from the free layered silicic acids or ammonium salts thereof or salts with the divalent cations $Cu^{2+}$, $Co^{2+}$ and/or $Ni^{2+}$. The analogous acid salts of layered silicic acids in which only some of the replaceable protons are replaced by ammonium and/or the divalent ions mentioned or the neutral salts which, in addition to ammonium, also contain at least one of the divalent cations mentioned behave likewise. The compounds which can thus be employed have the general formula $(NH_4)_r M_s H_t Si_y O_{2y+1}$, in which M represents the cations $Cu^{2+}$, $Co^{2+}$ and/or $Ni^{2+}$, y is a number from 1.7 to 24, r and t are numbers from 0 to 2, s is a number from 0 to 1 and the relationship $r+t+2s=2$ applies. The formation of cristobalite proceeds in the temperature range from 500° to 1,700° C., preferably at 1,200° to 1,400° C. Conversion of H-SKS-1 into cristobalite proceeds, for example, at 1,250° C. in the course of 1 hour.

Cristobalite is also formed, for example, from nickel disilicate and cobalt disilicate with a layered structure (Ni-SKS-6 and Co-SKS-6) on heating at 1,100° C.

The ammonium compounds employed already split off ammonia when heated slightly, and form the corresponding acid compound.

The content of divalent ions is probably converted into the corresponding meta- or orthosilicates on annealing. If compounds which are free divalent cations are employed, shaped articles of α-cristobalite containing at least 99% of $SiO_2$ (measured after calcining at 1,000° C.) can be produced. The metal-free layered silicic acids H-SKS-1, H-SKS-2 and H-SKS-6 are particularly suitable for this process, because they are easily accessible.

Shaped articles of cristobalite can be produced not only from the free layered silicic acids but also from acid alkali metal salts of the layered silicic acids $H_2Si_2O_5$ with low contents of alkali metal ions. These alkali metal salts have the general formula $M_{2-x}H_xSi_2O_5$, in which M represents $Na^+$, $Li^+$ and/or $K^+$ and x denotes a number from 1.5 to 2. These layered silicic acid salts are also annealed at 500° to 1,700°, preferably at 800 to 1,400 and in particular at 800° to 1,250° C., until conversion into cristobalite has taken place.

The compound Na-SKS-5 can be washed, for example, with water and some of the sodium can thus be replaced by protons. The resulting novel product ("Na-SKS-17") has the approximate composition $Na_{0.5}H_{1.5}Si_2O_5$. For this product, annealing at 800° C. is already sufficient to produce a shaped article which substantially consists of cristobalite and in which the most intense line in the X-ray diffraction diagram belonging to α-tridymite has only 6% of the intensity of the most intense line for α-cristobalite. At higher atomic ratios of Na/Si, the content of tridymite in the shaped article formed becomes even greater at the expense of cristobalite.

If free layered silicic acids are used without additives for the production of shaped articles of cristobalite, the resulting shaped articles show almost only the reflexes of α-cristobalite, and if appropriate also those of quartz or tridymite, in the X-ray diffraction spectrum. In general, the intensity of any line which cannot be attributed to the cristobalite thereby has a maximum of 20% of the intensity of the most intense line of the cristobalite. Thus, by annealing a shaped piece prepared from H-SKS-1 or H-SKS-2, it is possible to produce a shaped article of cristobalite of which the X-ray diffraction spectrum contains virtually no lines of $SiO_2$ modifications apart from the lines of the α-cristobalite. In this case, the intensity of any line which cannot be attributed to the cristobalite is between 0 and 3% of the most intense cristobalite line. If H-SKS-5 and H-SKS-6 are used as the starting material, the intensity of any line which cannot be attributed to the cristobalite is between 0 and 7% of the most intense cristobalite line.

As can be seen from the X-ray spectra, almost pure cristobalite is always formed from H-SKS-2 both at 1,200° and at 1,250°, 1,400° and 1,500° C. The crystallinity achieved is improved, in particular, by increasing the annealing temperature.

Shaped pieces of H-SKS-5 have particularly advantageous properties. These are already converted into cristobalite shaped articles at 800° C., the X-ray diffraction diagram of a comminuted sample of these shaped pieces showing only peaks of α-cristobalite.

It is known that cristobalite is formed from a layered silicic acid of the formula $H_2Si_8O_{17}.1.1H_2O$ at temperatures above 800° C. However, no cristobalite shaped articles have yet been produced in this manner.

In contrast, if H-SKS-1 is first converted into cristobalite powder at 1,250° C., it is scarcely possible to obtain shaped articles therefrom (in the absence of binders), since the shaped pieces obtained by pressing under 500 bar—in contrast to those from H-SKS-1—disintegrate again on removal from the mold.

Shaped articles of tridymite can be obtained if pulverulent alkali metal salts of layered silicic acids of the general formula $$M_r^I M_s^{II} H_t Si_y O_{2y+1}$$

in which $M^I$ denotes lithium, sodium and/or potassium, $M^{II}$ denotes magnesium and/or calcium, y is a number from 3 to 24, preferably 5 to 24, r is a number from 0.5 to 2, s is a number from 0 to 0.75 and t is a number from 0 to 0.5, with the proviso that $r+2s+t=2$ applies, are used as the starting material and the resulting shaped pieces are annealed at temperatures of 500° to 1,600° C., preferably 1,200° to 1,400° C., until shaped articles of tridymite have formed. For example, in addition to a little cristobalite, tridymite is formed from Ca-SKS-1 at 1,250°, and even more rapidly at 1,400° C. Under the same conditions, tridymite with even less cristobalite is formed from Ca-SKS-2.

According to statements in the literature, the presence of foreign ions is necessary for conversion into tridymite. Needless to say, shaped articles which predominantly consist of tridymite and have a content of at least 94% by weight (determined after calcining at 1,000° C.) as $SiO_2$ (free or bonded) can be produced in this manner. In the X-ray diffraction diagram, the intensity of any line which cannot be attributed to the tridymite has a maximum of 20% of the intensity of the most intense line of the tridymite. If Na-SKS-2 is employed, this intensity is only 12% of the most intense tridymite line.

Calcining to determine the $SiO_2$ content is envisaged in accordance with DIN 55921, sheet 2 (calcining at 1,000° C. for 2 hours). However, in the case of shaped articles which have been formed at temperatures above 1,000° C., this calcining is unnecessary. In the case of shaped articles which have been produced from free layered silicic acids at lower temperatures, in particular at 500° to 700° C., small amounts of chemically bonded water may also be removed by calcining.

Layered silicates with a low alkali metal content, thus, for example, with the kenyaite or magadiite structure (Na-SKS-1 and Na-SKS-2) are preferably employed to produce shaped articles of tridymite with the lowest possible content of foreign substances. In this case too, some of the alkali metal ions can also be replaced by protons. However, limits are imposed on this procedure since as the alkali metal content of the starting material decreases, cristobalite is also formed to an increasing degree, in addition to tridymite, on annealing.

The content of foreign substances, in particular alkali metals, can be reduced by washing the tridymite shaped articles obtained according to the invention with hot or cold water. This particularly applies to porous shaped articles.

Na-SKS-1 or Na-SKS-2 is preferably employed as the starting material for the production of shaped articles of tridymite since particularly high tridymite contents leading to a good water-stability and high melting point of the shaped articles can be achieved in this manner. The corresponding layered lithium or potassium silicates are also suitable.

In order to obtain shaped articles which consist of a mixture of cristobalite and tridymite, it is possible to use, as the starting material, a layered alkali metal silicate in which a considerable proportion of the alkali metal ions is replaced by protons, or mixtures of starting substances which are converted into cristobalite (example: layered silicic acids) and products which are converted into tridymite (example: layered alkali metal silicates) can be employed.

The shaped pieces retain their structure on heating; only a certain shrinkage thereby occurs. This shrinkage is based on conversion of the starting substance, at higher temperatures, into the cristobalite or tridymite of higher specific density. Linear shrinkage is of the order of about 10%, especially when H-SKS-1 or H-SKS-2 is used as the starting material. Shrinkage can be reduced if cristobalite and/or tridymite are/is admixed to the starting material. For conversion into cristobalite, 10 to 80% by weight, preferably 30 to 60% by weight, of cristobalite, based on the layered silicate to be converted, can be admixed to the starting substance. Shrinkage can also be reduced in an analogous manner in the production of shaped articles from tridymite by admixing tridymite to the starting material (for example Na-SKS-2).

It is surprising that pure powders of layered silicic acid—in contrast to powders of cristobalite—already give stable shaped pieces on pressing. However, in some cases it is advantageous to add small amounts, in particular amounts of up to 10% by weight, of inorganic or organic binders to the starting material. Thus, for example, the open porosity of the end product is reduced by also using silica sol. Addition of clays or kaolin increases the plastic workability of the starting composition. Customary organic binders are sulfite waste liquors, dextrin, methylcellulose, molasses, glycol or glycerol. Since they increase the stability of the shaped piece, they facilitate the production of thin-walled shaped articles. It is advantageous for them to be removable without trace on annealing, in particular in the presence of oxygen.

During annealing, the open porosity of the shaped pieces decreases. However, the shaped articles produced in general have open porosities of at least 30%. Pore-forming additives are only necessary if particularly high porosities are desired. The pore-forming agents are removed from the shaped articles by heat. Wood flour or starch has proved to be a suitable pore-forming additive. They burn to leave virtually no residue during annealing of the shaped article in an oxidizing atmosphere (air). Ammonium carbonate and ammonium bicarbonate are also suitable pore-forming agents. Both salts can be admixed to the pulverulent layered silicic acids (or salts thereof) in amounts of 0 to 25%, for example 10%, before shaping. They evaporate during later annealing. The porosity can be somewhat reduced by increasing pressure during production of the shaped piece. For example, H-SKS-1 gives a shaped article with an open porosity of 39% under a molding pressure of 200 bar with subsequent annealing (4 hours at 1,250° C.). In contrast, if pressing is carried out under 500 bar, the open porosity is only 31%. If a vacuum is applied before or during the pressing operation, the porosity can be reduced even further.

The shaped articles according to the invention can have different geometric shapes and sizes. They can have, for example, the shape of spheres, cubes, parallelepipeds, cylinders, prisms, sheets or elongated hollow articles, such as, for example, tubes or honeycombed articles.

The shaped articles according to the invention have a Shore hardness of at least 70. If they predominantly consist of cristobalite, the content of $SiO_2$ (free or bonded) can be at least 99% by weight (measured after calcining at 1,000° C.). If they consist predominantly of tridymite, their minimum content of $SiO_2$ (free or bonded) can be 94% by weight (determined after calcining at 1,000° C.). If the shaped articles according to the invention consist of a mixture of tridymite and cristobalite, a minimum content of SiO$_2$ (free or bonded) of 97% by weight can be achieved.

If calcium salts of layered silicic acids are not employed as the starting substance, the shaped article obtained is virtually free from calcium. Shaped articles with a calcium content of less than 0.02%, by weight can thus be produced. In contrast, the calcium content of silica bricks is higher and their softening point is lower.

The porosities are determined in vacuo with water in accordance with DIN 51056. Since the shaped articles according to the invention have a high porosity, they are particularly suitable for impregnation with aqueous solutions or solutions in organic solvents. They can therefore be used as supports for catalyts. For example, they can be impregnated with metal salt solutions, such as, for example, solutions of copper nitrate, nickel nitrate or cobalt acetate, the solvent, in particular water, can then be evaporated by heating, the metal salts can be decomposed, if appropriate, to their oxides and these can be reduced to the corresponding metals (for example with hydrogen). In order to promote impregnation of the shaped articles, the metal salt solutions can contain non-ionic or anionic wetting agents, such as, for example, oxyethylated alkylphenols or alkylarylsulfonates. Starting from copper nitrate, hydrogenation catalysts, in particular for the gas phase, are obtained in this manner.

Because of their high porosity, the shaped articles according to the invention are also suitable for thermal insulation in a wide temperature range, for example in the range from 0° C. to 1,300° C.

Shaped pieces of high density can be produced by applying high pressing pressures and by evacuation during pressing. From these, it is possible to produce shaped articles which are virtually no longer porous. These can be employed in all cases where hard, dense ceramic substances are required, thus, for example, as furnace lining, for heat-resistant pipes or vessels or as engine components. These ceramic substances can be employed at temperatures up to more than 1,500° C., if they consist of cristobalite. The upper limit of the field of application is imposed by the melting point of cristobalite (1,700° C.). The smaller the concomitant amounts of substances in addition to cristobalite, the greater the melting point. The tridymite shaped articles according to the invention can also be employed; however, the melting point here is somewhat lower because of the unavoidable concomitant amounts of alkali metal compounds, so that these substances can be employed only up to about 1,500°.

The invention is illustrated in more detail by the examples.

EXAMPLE 4

300 g of Na-SKS-1 are moistened with 240 g of H$_2$O and passed through an extruder. Short strands 3 mm in diameter and 4 mm in length are formed. These are then rounded off in a pelleting drum to give granules without edges. These are dried at 120° C. for 2 hours. The hardness, measured with a hardness tester from Chas. Pfizer Co., Inc., New York, is 3 kg. The hardness tester is a pair of test gongs for tablets. Taking into consideration the plunger surface of 3.1 mm$^2$ over which the pressure is exerted on the test piece, conversion of the measurement values into bar results in a factor for 3.2, i.e. 3 kg correspond to 9.6 bar.

The granules are annealed at 1,250° C. for 4 hours. The annealed granules are stable in water and withstand a pressure of 23 bar in the hardness tester. The X-ray diffraction spectrum is that of $\alpha$-tridymite (low temperature form).

EXAMPLE 2

400 g of Na-SKS-2 are moistened with 320 g of H$_2$O and granules are produced therefrom, which are then annealed as described in Example 1. The granules consist chiefly of $\alpha$-tridymite. They are stable in water and withstand a pressure of 27.5 bar in the hardness tester. Analytical result: SiO$_2$: 94%; CaO: 0.017%; Al$_2$O$_3$: 0.55%; Fe$_2$O$_3$: 0.12%; and Na$_2$O: 4.99%.

EXAMPLE 3

H-SKS-1 is prepared by reaction of Na-SKS-1 with hydrochloric acid. Granules are produced from moist H-SKS-1 by the process of Example 1. The granules annealed at 1,250° C. withstand a pressure of 21 bar in the hardness tester and are stable in water. The X-ray diffraction spectrum is that of $\alpha$-cristobalite.

Analytical result: SiO$_2$: 99%; CaO: 0.08%; Al$_2$O$_3$: 0.38%; Fe$_2$O$_3$: 0.04%, and Na$_2$O: 0.10%.

EXAMPLE 4

5.22 g of pulverulent dry Na-SKS-1 are pressed in a tube-shaped press with an internal diameter of 16 mm under a plunger pressure of 500 bar for 5 minutes and the product is then annealed at 1,250° C. for 4 hours. The crude cylindrical tridymite shaped article thus obtained (diameter of 13.4 mm) has a Shore hardness (D according to DIN 53305) of 77 and a density of 1.91. The open porosity (in accordance with DIN 51056-A-2) is 22%.

EXAMPLE 5

6.0 g of Na-SKS-2 are pressed to a cylindrical shaped articles of 16.3 mm diameter as in Example 4. The shaped article has a Shore hardness of 60 and a density of 1.04. It is annealed at 1,250° C. and has a density of 1.72 and a Shore hardness of 75. Its diameter is 14.8 mm, and the linear shrinkage is thus 9%. The X-ray diffraction spectrum is that of $\alpha$-tridymite. The SiO$_2$ content is more than 94.0%.

EXAMPLE 6

Freshly prepared H-SKS-1 washed with water is dried at 100° C. 4.99 g of this are pressed as in Example 4 with a plunger pressure of 500 bar to give a cylindrical shaped article 16.4 mm in diameter and 20.9 mm in height. The shaped article is annealed at 1,250° C. for 4 hours, and is then stable in water and has a density of 1.45. The dimensions are: diameter 14.7 mm and height 19.1 mm. The linear shrinkage was thus 10 and 9% respectively. The open porosity has a value of 31%. The X-ray diffraction spectrum is that of $\alpha$-cristobalite. The SiO$_2$ content is more than 99% by weight.

EXAMPLE 7

Example 6 is repeated with a plunger pressure of 200 bar. The open porosity of the annealed article (4 hours, 1,250° C.) is 39%.

EXAMPLE 8

Freshly prepared H-SKS-2 washed with water is dried at 100° C. 4.06 g of this are pressed as in Example 4 to give a cylindrical shaped article 16.3 mm in diameter and 22.7 mm in height. The shaped article is annealed at 1,500° C. for 4 hours and then has a Shore hardness of 70 and a density of 1.97. It is stable in water. The open porosity is only 9%. The article has the dimensions: diameter 12.7 mm and height 18.6 mm. This corresponds to a linear shrinkage of 22 and 18% respectively. The article chiefly consists of cristobalite. The $SiO_2$ content is more than 99% by weight.

EXAMPLE 9

Example 8 is repeated, but the annealing conditions are varied. The degree of crystallinity is given by the height of the most intense characteristic peak of critobalite in the X-ray diffraction spectrum at $4.05 \times 10^{-8}$ cm. The results are shown in the following table.

| Temperature | Time | Height of the peak |
|---|---|---|
| 1100 (°C.) | 4 (hours) | ~1 (cm) = amorphous |
| 1200 | 7 | 9 |
| 1250 | 1 | 23.3 |
| 1250 | 4 | 24 |
| 1400 | 0.5 | 11 |
| 1400 | 4 | >24 |
| 1500 | 4 | >24 |

EXAMPLE 10

Shaped articles which have a diameter of 51.4 mm and a height of about 50 mm are produced from H-SKS-1 by pressing under 480 bar in a cylinder-shaped tube with a plunger. The density is 1.05. After annealing at 1,500° C. for 4 hours, the article has a density of 1.64 and a Shore hardness of 82. The article consists chiefly of cristobalite. The $SiO_2$ content is more than 99% by weight.

EXAMPLE 11

A cristobalite shaped article described in Example 6 and annealed at 1,250° C. is impregnated with 0.35 cm$^3$/cm$^3$ of a 10% strength aqueous solution of Cu(NO$_3$)$_2$.2H$_2$O in vacuo.

The impregnated shaped article is dried and then kept at 350° C. for 2 hours. The copper nitrate thereby decomposes to CuO. After reduction in a hydrogen/nitrogen mixture, the shaped article is suitable as a hydrogenation catalyst in the gas phase.

EXAMPLE 12

80 g of Na-SKS-5 are suspended in 1 liter of distilled water at room temperature, with stirring. After 1 hour, the product is filtered off, dried at 100° C. for 2 hours and ground in a cross beater mill.

The product thus obtained has the approximate composition $Na_{0.5}H_{1.5}Si_2O_5$ and has been given the designation Na-SKS-17.

It has the following X-ray diffraction spectrum:

| a | J/J$_o$ |
|---|---|
| $9.60 \cdot 10^{-8}$ cm | 100 |
| 4.77 | 31 |
| 3.77 | 41 |
| 3.51 | 40 |
| 3.17 | 72 |

4.8 g of Na-SKS-17 are pressed to a cylindrical shaped article as in Example 4. After annealing at 800° C. for 4 hours, the shaped article consists of cristobalite. The most intense line in the X-ray diffraction spectrum which belongs to α-tridymite has only 6% of the intensity of the most intense line for α-cristobalite.

EXAMPLE 13

A circular sheet about 70 mm in diameter and 2 mm thick is produced from H-SKS-1 in a heated press under 600 bar at 240° C. It is substantially firmer than a sheet pressed at room temperature.

On further heating (1,250° C., 1 hour), a cristobalite sheet is formed from it.

EXAMPLE 14

A sheet pressed from H-SKS-2 (diameter 64 mm) was annealed at 1,250° C. for 4 hours and thereby converted into a cristobalite sheet. Thereafter, the diameter was only 60 mm (linear shrinkage of 6.3%).

In contrast, if a pulverulent mixture of 70% of H-SKS-2 and 30% of cristobalite is used as the starting substance, a cristobalite plate with a diameter of 62 mm is formed (linear shrinkage of 3.1%).

EXAMPLE 15

(preparation of Na-SKS-1)

A reaction mixture with the molar composition
$0.303Na_2O:0.0052Al_2O_3:SiO_2:30H_2O$
is first prepared by adding 83.5 parts by weight of soda waterglass (27% of $SiO_2$, 8.43% of $Na_2O$ and 0.24% of $Al_2O_3$) to 149 parts of water. Thereafter, some of a filter-moist crystalline sodium silicate from an earlier experiment (71% weight loss by heating to 1,200° C.; only the water content has been taken into consideration for calculation of the molar composition) is added. 4.93 parts of 96% strength sulfuric acid are then slowly added, with stirring. The reaction mixture then has the following molar composition:
$0.174Na_2O:0.0052Al_2O_3:SiO_2:0.129Na_2SO_4:30\ H_2O$.

The reaction mixture is heated to 205° C., in a stainless steel autoclave in the course of 1.5 hours, kept at this temperature for 2.5 hours and then cooled slowly. After cooling, the reaction mixture is filtered, washed with water and sucked dry on a suction filter. The filter-moist product has a loss on calcining of 55%. The product dried in air for a short time is investigated by thermogravimetry. A weight loss of 43% occurred up to a temperature of about 140° C. At about 1,000° C., no further substantial loss in weight was observed. The product, Na-SKS-1, dried to constant weight at 120°0 C. shows the following composition on elemental analysis: 3.8% of Na, 0.24% of Al, 41.5% of Si and 0.003% of Fe. A molar ratio of $SiO_2/Na_2O$ of 17.9 can be calculated from this.

EXAMPLE 16

(preparation of H-SKS-1)

The crystalline Na silicate from Example 15 is extracted twice with 5% strength hydrochloric acid at 80° C. for 15 minutes. The product is washed, filtered and dried at 40° C. Investigation by differential thermal analysis shows a pronounced endothermic conversion at about 120° C. and a substantially less pronounced endothermic conversion at about 1,180° C.

EXAMPLE 17

(preparation of Na-SKS-2)

A product with the same educt composition as in Example 15 is prepared. Seed crystals of a magadiitelike silicate from an earlier experiment are added to the reaction mixture. The reaction mixture is stirred at 165° C. for 19 hours and, after cooling, filtered and the solid is washed with water and sucked dry on a suction filter. 10 g of the mother liquor of the reaction mixture, diluted with 250 ml of water, had a pH of 10.4. The filter-moist product, which loses 61.3% of its weight on calcining (>1,000° C.), is titrated with sulfuric acid, and an equivalence value of 215 mequivalents/100 g of calcined product is determined from the turning point of the titration curve at pH 5.0. An ion exchange capacity of 138 mmol of Na+/mole of $SiO_2$, corresponding to an $SiO_2:Na_2O$ ratio of 14.5:1, is determined therefrom for a product with the composition $Na_2O.ySiO_2$. If no seed crystals are used, significantly longer reaction times become necessary.

EXAMPLE 18

(preparation of H-SKS-2)

100 g of moist product from Example 17 are added to 200 ml of 5% strength hydrochloric acid and the mixture is stirred at room temperature for 1.25 hours. The product is filtered and added again to the same amount of hydrochloric acid and the mixture is stirred for 25 hours, filtered and thoroughly washed twice with water, the product being stirred with water and washed during filtration. The product is then sucked dry. It has a loss on calcining on 57%. 10 g of the product which has been sucked dry are added to 1,900 ml of 5% strength NaCl solution and then titrated with 1M NaOH. On graphical representation of the titration values, an equivalence value of 235 mol of H+/100 g of calcined product is determined from the turning point of the curve at pH 8.3. An ion exchange capacity of about 144 mequivalents/mole of $SiO_2$, corresponding to an $SiO_2:Na_2O$ ratio or an $SiO_2/2H^+$ ratio of 13.9:1, is determined therefrom.

We claim:

1. A process for the preparation of shaped articles of silicate material, which comprises shaping a pulverulent layered silicic acid of the formula $H_2Si_yO_{2y+1}$, in which y is a number from 1.7 to 24, or a salt thereof, in which all or some of H is replaced by at least one cation from the group comprising Li+, Na+, K+, NH4+, Ca2+, Cu2+, Ni2+ and Mg2+, into pieces and heating the pieces under conditions such that the starting material is chiefly converted into cristobalite and/or tridymite.

2. A process as claimed in claim 1, which comprises mixing a pulverulent layered silicic acid of the formula $H_2Si_yO_{2y+1}$, in which y is a number from 1.7 to 24, or a salt thereof, in which all or some of H is replaced by at least one cation from the group comprising Li+, Na+, K+, NH4+, Ca2+, Cu2+, Co2+, Ni2+ and Mg2+, with water or an organic solvent, extruding and/or pelleting the mixture to roll-shaped or tube-shaped pieces and then drying and heating the pieces under conditions such that the starting material is chiefly converted into cristobalite and/or tridymite.

3. A process as claimed in claim 1, which comprises pressing a pulverulent layered silicic acid of the formula $H_2Si_yO_{2y+1}$, in which y is a number from 1.7 to 24, or salt thereof, in which all or some of the H is replaced by at least one cation from the group comprising Li+, Na+, K+, NH4+, Ca2+, Mg2+, Cu2+, Co2+, Ni2+ and Mg2+, in a molding tool under pressure to give shaped pieces and heating the shaped pieces during or after pressing under conditions such that the starting material is chiefly converted into cristobalite and/or tridymite.

4. The process as claimed in claim 1, wherein a pulverulent layered silicate of the general formula $(NH_4)_rM_sH_tSi_yO_{2y+1}$, in which M represents the cations Cu2+, Co2+ and/or Ni2+, r and t are numbers from 0 to 2, s is a number from 0 to 1 and r+t+2s=2 applies, is used as the starting material and the resulting shaped pieces are heated at 500° to 1,400° C., until a conversion into cristobalite has taken place.

5. The process as claimed in claim 1 wherein a pulverulent alkali metal salt of a layered silicic acid of the general formula $$M_r^IM_s^{II}H_tSi_yO_{2y+1}$$

in which $M^I$ denotes Li, Na and/or K, $M^{II}$ denotes Mg2+ and/or Ca2+, r is a number from 0.5 to 2, s is a number from 0 to 0.75 and t is a number from 0 to 1.5, with the proviso that r+2s+t=2 applies, is used as the starting material and the resulting shaped pieces are heated at temperatures of 500° to less than 1,600° C., until tridymite shaped articles have formed.

6. The process as claimed in claim 1 wherein a layered silicic acid or an alkali metal salt of a layered silicic acid of the composition $M_{2-x}H_xSi_2O_5$, in which M represents Na+, Li+ and/or K+ and x denotes a number from 1.5 to 2, is used as the starting material and the resulting shaped articles are heated to 800° to 1,400° C., until conversion into cristobalite has taken place.

7. The process as claimed in claim 1 wherein pulverulent cristobalite and/or tridymite is added to the starting material.

8. The process as claimed in claim 3, wherein pressing to shaped pieces is carried out after moistening of the pulverulent starting material with water or an organic solvent.

9. The process as claimed in claim 1 carried out with the addition of a binder.

10. The process as claimed in claim 1 wherein a pore-forming agent is added to the starting substance.

11. A process according to claim 1 wherein the starting material is essentially free of binder.

12. A process for the preparation of a shaped article of substantially uniform composition, said process comprising:

shaping into an uncalcined, shaped article a starting material consisting essentially of a pulverulent layered silicic acid of the formula $H_2Si_yO_{2y+1}$, in which y is a number from 1.7 to 24, or a salt thereof in which at least some of the H of said formula is replaced by at least one cation selected from Li+, Na+, K+, NH4+, Ca+2, Cu+2, Co+2, Ni+2, or Mg+2, the resulting shaped, uncalcined article having mechanical stability without any heat treatment above 500° C.;

heating the unfired, shaped article to a temperature sufficient to convert the starting material into a substantially uniform composition consisting essentially of cristobalite or tridymite or mixtures thereof.

13. A process as claimed in claim 12, wherein the starting material contains moisture or organic solvent, but only sufficient moisture or organic solvent to form a paste; the paste is shaped into an uncalclined, shaped article; the resulting uncalcined, shaped article is dried at a temperature below 500° C. to form an uncalcined, shaped article with mechanical stability; and the resulting dried article with mechanical stability is heated to a temperature above 500° C., but less than 1600° C., until the starting material has been converted into said substantially uniform composition consisting essentially of cristobalite or tridymite or mixtures thereof.

14. A process as claimed in claim 12, wherein the starting material is essentially free of binder and essentially free of calcium content, but the mechanical stability of the uncalcined, shaped article is not substantially adversely affected by such lack of binder.

15. A process as claimed in claim 12, wherein the product of said process, obtained after heating to a temperature above 500° C. but below 1600° C. is a shaped article having a Shore hardness of at least 70, and wherein the content of $SiO_2$, free or bonded, is at least 94% by weight, determined after calcining at 1000° C.

16. A process as claimed in claim 15, wherein the said $SiO_2$ content is at least about 99% by weight, and the porosity, as measured in accordance with DIN 51056, is at least 30%.

17. A process as claimed in claim 15, wherein the said $SiO_2$ content is at least about 97% by weight.

18. A process as claimed in claim 12, wherein the uncalcined, shaped article is heated to a temperature above 800° C., but not substantially above 1400° C., until the starting material has been converted to said substantially uniform composition.

19. A process as claimed in claim 18, wherein the said temperature is in the range of 1200° to 1400° C.

20. A process as claimed in claim 12 wherein the uncalcined, shaped article having mechanical stability is in granular form.

21. A process as claimed in claim 12 comprising the additional step of forming a resulting shaped article having a said substantially uniform composition into a fire-proof brick, a catalyst support, or a thermal insulating material.

* * * * *